No. 893,150. PATENTED JULY 14, 1908.
J. P. DRISCOLL.
THILL COUPLING.
APPLICATION FILED MAR. 6, 1908.

UNITED STATES PATENT OFFICE.

JOHN P. DRISCOLL, OF GREENLAND, MICHIGAN.

THILL-COUPLING.

No. 893,150.

Specification of Letters Patent.

Patented July 14, 1908.

Application filed March 6, 1908. Serial No. 419,414.

*To all whom it may concern:*

Be it known that I, JOHN P. DRISCOLL, a citizen of the United States, residing at Greenland, in the county of Ontonagon and State of Michigan, have invented certain new and useful Improvements in Thill-Couplings, of which the following is a specification.

This invention relates to thill-couplings, and more particularly to a device of this kind adapted for sleighs; and the invention has for its object to provide such a device which is simple and inexpensive, and by means of which the thills can be quickly attached or detached.

Figure 1:
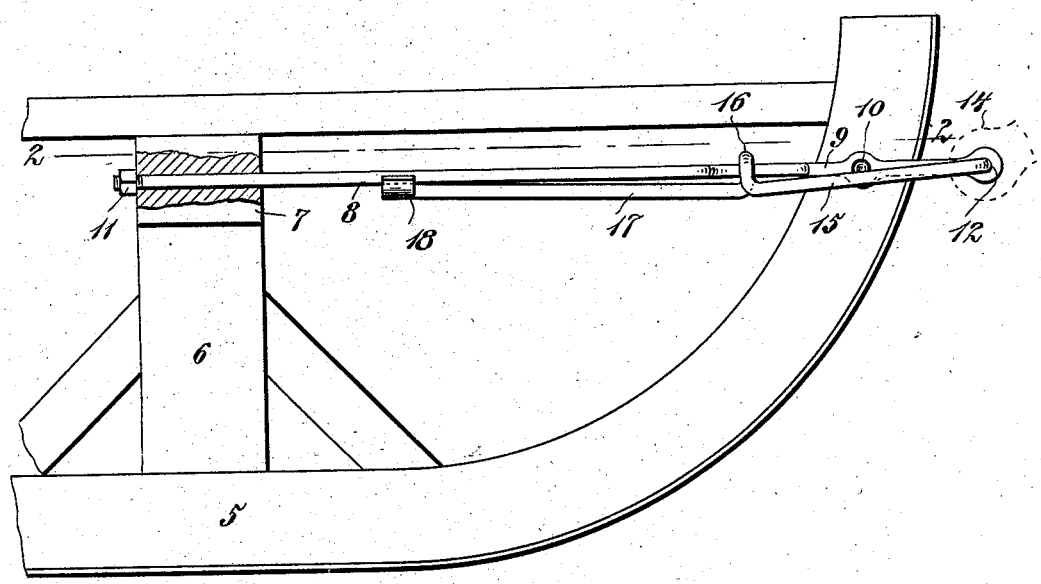
Figure 2:
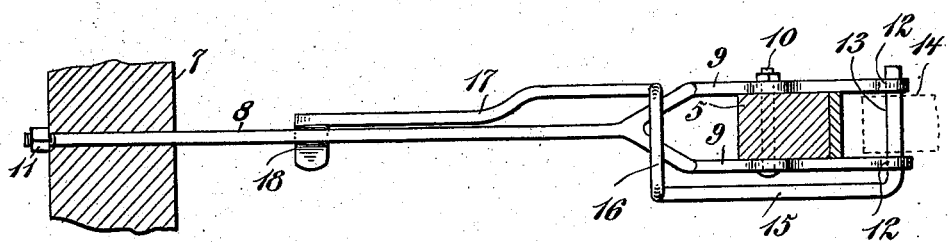

In the accompanying drawing, Figure 1 is a side elevation showing the application of the invention, only so much of the sleigh being shown as will suffice to show the connection of the invention therewith. Fig. 2 is a section on the line 2—2 of Fig. 1.

Referring specifically to the drawing, 5 denotes one of the runners of a sleigh; 6 is one of the knees at the front end thereof; and 7 is one of the benches supported by the latter. These parts are arranged in the ordinary manner and nothing is claimed with respect thereto.

My improved thill-coupling comprises a rod 8 having at one end a fork, the branches 9 of which extend on opposite sides of the curved or front end of the runner 5 and are made fast thereto by a transverse bolt 10 passing through said parts. The other end of the rod passes through a hole in the bench 7 and behind the same is threaded to receive a nut 11 whereby it is securely held in place. In front of the runner, the branches 9 are enlarged and have alined holes 12 to receive a cross-pin 13 to which the thill-iron 14 is connected. This pin is formed integrally at one end of a rod 15 extending beside the fork, and behind the runner. This rod has an upward and lateral bend 16 to form an offset portion 17, at the extremity of which is a laterally projecting finger 18. When the coupling is in place, the part 16 passes over the fork behind the runner and the part 17 extends along the rear end of the rod 8 with the finger 18 engaging the under side thereof. The rod 15 is made of spring metal by reason of which the spring-finger will engage the rod 8 with sufficient force to tightly hold the coupling in place. To release the thills it is necessary only to disengage the spring-finger 18 after which the pin 13 can be slipped out of the holes 12 and the thill-iron released. The spring-finger is curved to fit the rod snugly and its free end is turned up slightly so that it may be readily taken hold of to release the thills as stated.

The device herein described is simple in construction and can be cheaply produced, it securely couples the thills, and it enables them to be readily applied and removed.

I claim:

1. A thill-coupling for sleighs comprising a rod secured to the front bench, and having a fork extending on opposite sides of the runner, the branches of the fork in front of the runner having alined holes, fastening means passing through the fork and the runner, a pin mounted in the holes of the fork-branches, a thill-iron mounted on the pin, and means for holding the pin in place.

2. A thill-coupling for sleighs comprising a rod secured to the front bench, and having a fork extending on opposite sides of the runner, the branches of the fork in front of the runner having alined holes, fastening means passing through the fork and the runner, a rod having a laterally projecting pin passing through the holes of the fork-branches, and a resilient offset portion behind the runner engageable with the first mentioned rod, and a thill-iron mounted on the pin.

3. A thill-coupling for sleighs comprising a rod secured to the front bench, and having a fork extending on opposite sides of the runner, the branches of the fork in front of the runner having alined holes, fastening means passing through the fork and the runner, a rod having at one end a laterally projecting pin passing through the holes of the fork-branches, a lateral bend at the other end of the rod passing over the fork behind the runner, and having a spring-arm engageable with the first mentioned rod, and a thill-iron mounted on the aforesaid pin.

In testimony whereof I affix my signature, in presence of two witnesses.

JOHN P. DRISCOLL.

Witnesses:
WALTER E. VAN SLYCK,
F. J. LARNED.